United States Patent
Tu et al.

(10) Patent No.: US 7,242,673 B2
(45) Date of Patent: Jul. 10, 2007

(54) MESSAGE BARRING SYSTEM AND METHOD THEREOF

(75) Inventors: Hai-Lun Tu, Taipei (TW); Ching-Yu Lin, Hsinchu (TW)

(73) Assignee: Benq Corporation, Taoyuan (TW)

( * ) Notice: Subject to any disclaimer, the term of this patent is extended or adjusted under 35 U.S.C. 154(b) by 502 days.

(21) Appl. No.: 10/971,940

(22) Filed: Oct. 21, 2004

(65) Prior Publication Data

US 2005/0113119 A1    May 26, 2005

(30) Foreign Application Priority Data

Nov. 11, 2003   (TW)   .............................. 92131508 A

(51) Int. Cl.
*H04Q 7/00*    (2006.01)

(52) U.S. Cl. ............... 370/328; 370/329; 370/252; 455/466; 455/418; 709/224

(58) Field of Classification Search ................ 370/328, 370/329, 252; 455/466, 418; 709/224
See application file for complete search history.

(56) References Cited

U.S. PATENT DOCUMENTS

| | | | |
|---|---|---|---|
| 6,208,870 B1 * | 3/2001 | Lorello et al. .............. | 455/466 |
| 6,263,212 B1 * | 7/2001 | Ross et al. .................. | 455/466 |
| 6,289,223 B1 * | 9/2001 | Mukherjee et al. ......... | 455/466 |
| 6,512,926 B1 * | 1/2003 | Henry-Labordere ........ | 455/445 |
| 6,781,972 B1 * | 8/2004 | Anderlind et al. .......... | 370/329 |
| 7,050,408 B2 * | 5/2006 | Shen et al. .................. | 370/329 |
| 2001/0029174 A1 * | 10/2001 | Herajarvi et al. ........... | 455/406 |
| 2002/0019243 A1 * | 2/2002 | Zhang et al. ............... | 455/466 |
| 2003/0065615 A1 * | 4/2003 | Aschir ........................ | 705/39 |
| 2004/0127239 A1 * | 7/2004 | Cho ........................... | 455/466 |
| 2006/0120367 A1 * | 6/2006 | Beckmann et al. ......... | 370/390 |

* cited by examiner

*Primary Examiner*—Danh C. Le
(74) *Attorney, Agent, or Firm*—Thomas, Kayden, Horstemeyer & Risley

(57) ABSTRACT

A system and method for short message (SM) barring. A storage device stores a service configuration record comprising a telephone number, a first parameter and a second parameter. The first parameter indicates whether the telephone number allows incoming short message service (SMS) in a first mobile network, and the second parameter indicates whether the telephone number allows short message transmission via a second mobile network. A process unit receives a SM transmission request with a destination telephone number and an SM, acquires both the first parameter and the second parameter corresponding to the destination telephone number from the service configuration record, and transmits an error message if both the first parameter and the second parameter are negative.

20 Claims, 7 Drawing Sheets

MESSAGE BARRING SYSTEM AND METHOD THEREOF

BACKGROUND OF THE INVENTION

1. Field of the Invention

The present invention relates to message barring technology, and more particularly, to a method and system of message barring across mobile networks.

2. Description of the Related Art

FIG. 1 is a diagram of the architecture of a conventional GSM network for short message service (SMS). The architecture includes mobile stations (MSs) 11, 12, message switching centers (MSCs) 13, 16, a short message switching center (SMSC) 14, a home location register (HLR) 15, and a visit location register (VLR) 17. The MSC 13 connects multiple base stations (not shown) to receive short messages from the MS 11. When the MS 11 sends a short message (SM) to the MS 12, the SM is first transmitted to the SMSC 14 via the MSC 13. The HLR provides a database storing all MS (i.e., subscriber) profile information and service configuration information for each MS in GSM network for SMS authentication. The SMSC 14, the kernel device for SMS, stores the SM temporarily, authenticates the MS 12 by interrogating the HLR 15, and transmits the SM to the MSC 16 until the MS 12 is active within a time period; otherwise, time-out control is executed. The VLR 17 provides a database storing base station information in which the MS 12 is registered, thus enabling the MSC 16 to transmit MS to the MS 12 via the relevant base station (not shown).

FIG. 2 is a diagram of conventional GSM communication of SMS. When the MS 11 sends an SM to the MS. 12, a transmission request 21 with the SM, a source telephone number and a destination telephone number is transmitted to the SMSC 14 via the MSC 13. The SMSC 14 authenticates the MS 12 by interrogating the HLR 15, acquires routing information 22 upon successful authentication, and accordingly transmits the SM, the origin telephone number and the destination telephone number to the MSC 16. The MSC 16 acquires register information 23 by querying the VLR 17, and accordingly transmits the SM, the source telephone number and the destination telephone number to the MS 12. A transmission complete message is sequentially transmitted to the SMSC 14, MSC 13 and MS 11 upon successfully receipt of the SM by the MS 12.

Supplementary services have been used to enable or disable certain communication services including the SMS. MS ability to send/receive SM is configured through supplementary services, the configuration stores in the HLR 15. Although the SM can be barred by disabling SM receiving service, the SM is still received when the MS 12 is attached in a GPRS network. FIG. 3 is a flowchart showing a conventional method for routing information response. The process begins in step S31 to receive a routing information request. Step S32 determines whether the MS 12 has disabled the SM receiving service, and if so, the process proceeds to step S34; otherwise, the process proceeds to step S33 to transmit GSM routing information. Step S34 determines whether the MS 12 has registered GPRS services, and if so, the process proceeds to step S36 to transmit GPRS routing information; otherwise, the process proceeds to step S35 to transmit an error message. Similarly, although the SM can be barred by disabling SM sending service, the SM is still sent when the MS 11 is attached in GPRS network.

In view of these limitations, a need exists for a system and method of SM barring that avoids SM transmission via the GPRS network.

SUMMARY OF THE INVENTION

It is therefore an object of the present invention to provide a system and method of short message (SM) barring to avoid SM transmission via GPRS network.

According to the invention, the system comprises a storage device, a first process unit and a second process unit. The storage device stores multiple service configuration records individually comprising a telephone number, and first, second and third parameters, the parameters respectively indicating whether the MS corresponding to the telephone number allows incoming short message service (SMS) in a GSM network, outgoing SMS in a GSM network, and SM transmission via a GPRS network.

The first process unit receives a SM transmission request with a source telephone number, a destination telephone number and an SM, and acquires both first and third parameters corresponding to the destination telephone number from the service configuration records. It is determined whether both the first and third parameters are negative, and, if so, the first process unit transmits an error message; otherwise, the first process unit transmits the SM to the destination mobile station (MS) corresponding to the destination telephone number by executing a mobile terminated short message service (MT_SMS) procedure.

The second process unit receives a SM transmission request with a source telephone number, a destination telephone number and an SM from a source MS corresponding to the source telephone number, and acquires both second and third parameters corresponding to the source telephone number from the service configuration records. It is determined that both the second and third parameters are negative, and, if so, the second process unit transmits an error message; otherwise, the second process unit transmits the SM to the destination mobile station (MS) by executing a mobile originated short message service (MO_SMS) procedure.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
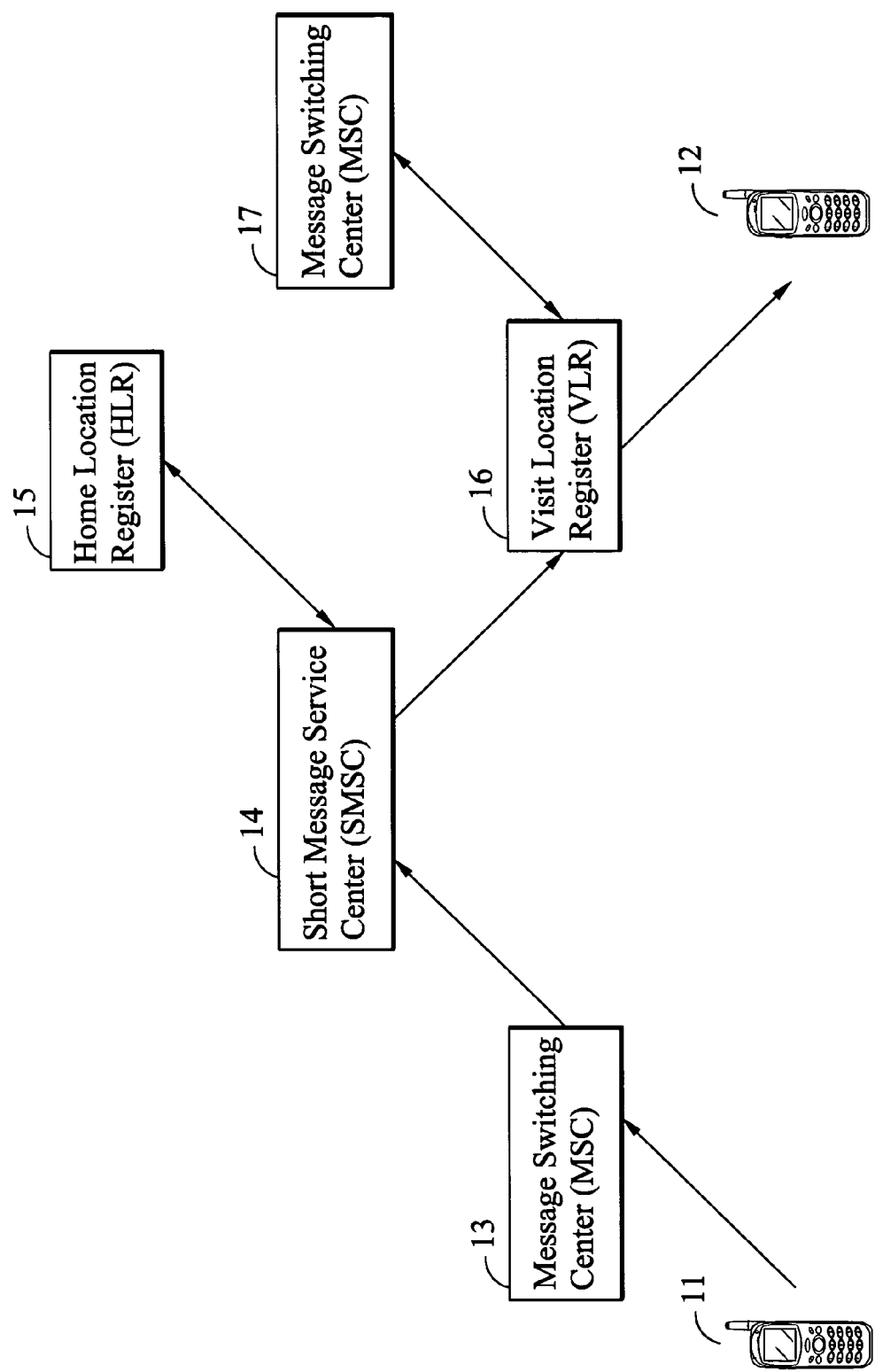
FIG. 1 is a diagram of the architecture of a conventional GSM network for short message service (SMS)
Figure 2:
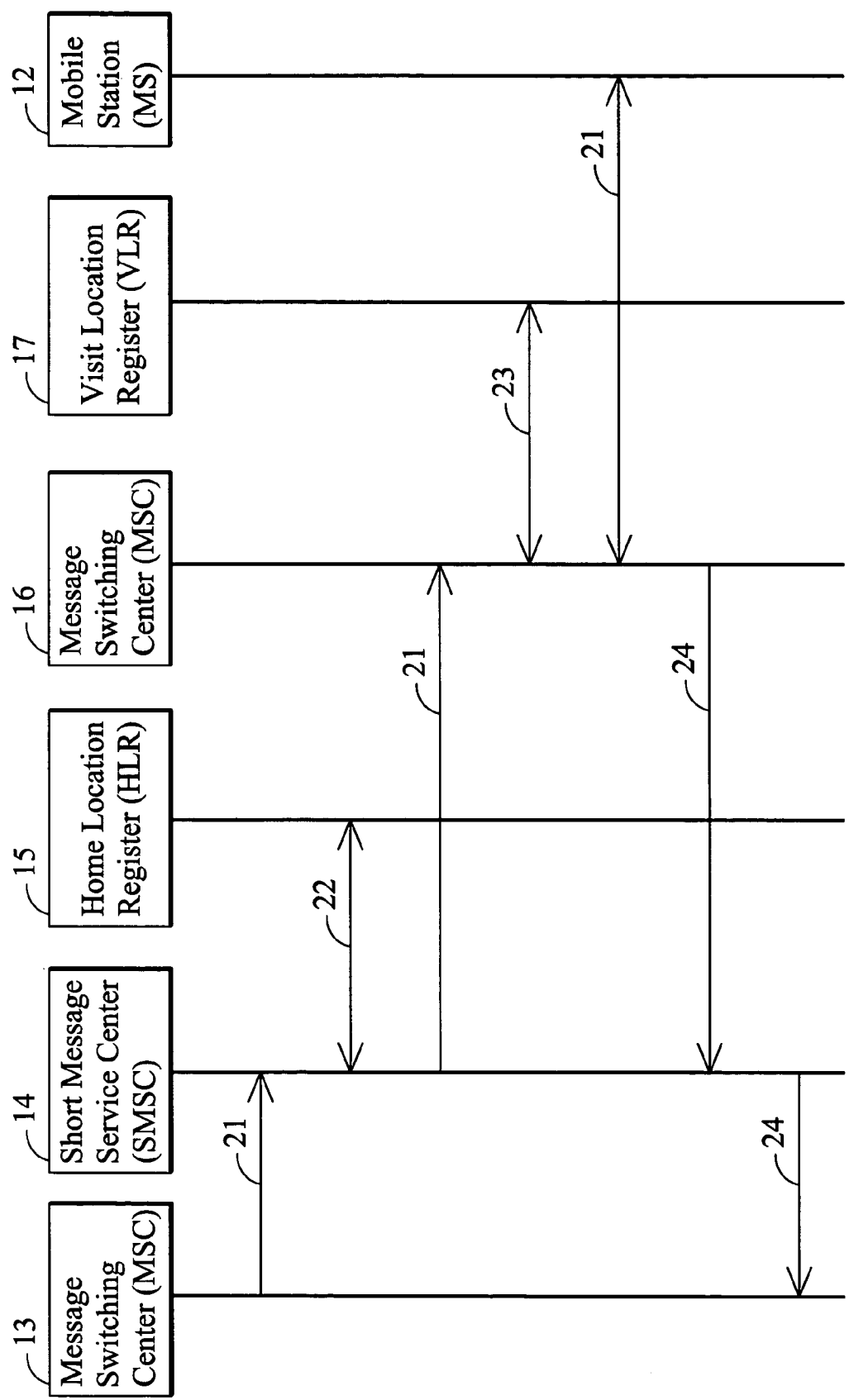
FIG. 2 is a diagram of conventional GSM communication of SMS.
Figure 3:
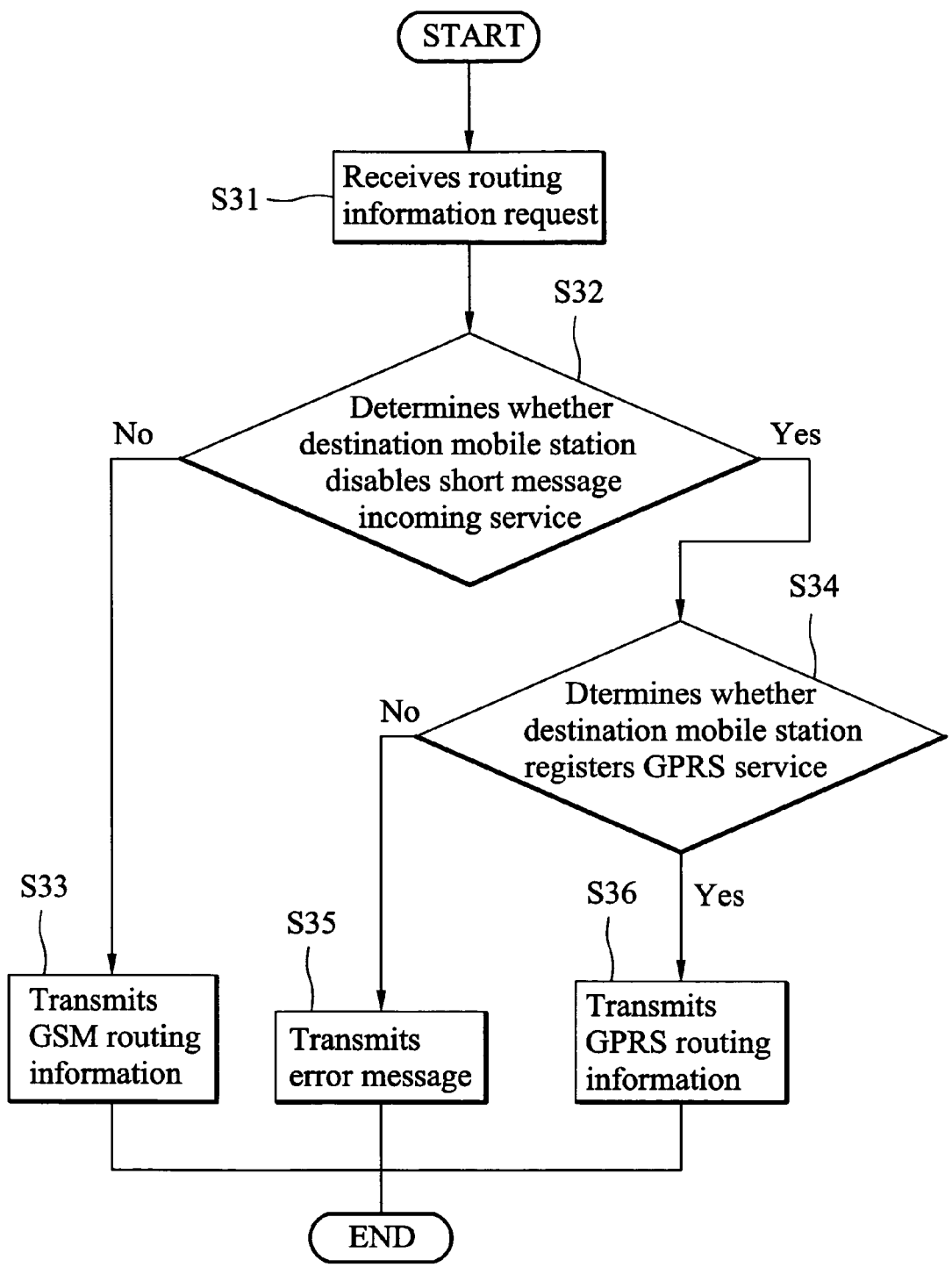
FIG. 3 is a flowchart showing a conventional method for routing information response.
Figure 4:
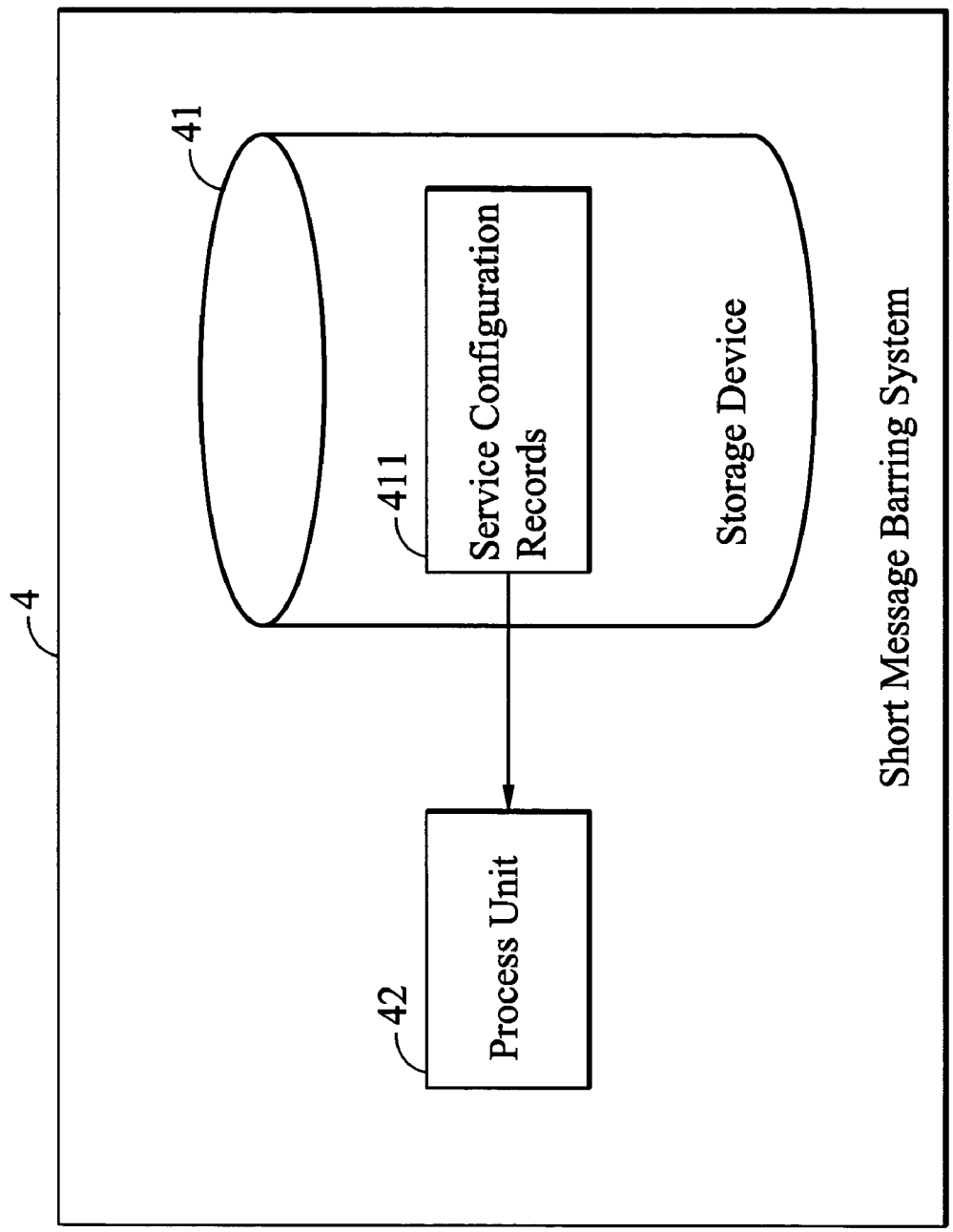
FIG. 4 is a diagram of the system architecture of short message barring according to a first embodiment of the invention.

FIG. 4 is a diagram of the system architecture of short message barring according to a first embodiment of the invention. The system 4 comprises a storage device 41, and a process unit 42. The storage device 41 may be implemented in a home location register (HLR) and the like. The process unit 42 may be implemented in the HLR or a serving GPRS support node (SGSN) within GPRS network. The storage device 41 stores multiple service configuration records 411 individually comprising a telephone number, and first, second and third parameters, the parameters respectively indicate whether the MS corresponding to the telephone number allow incoming short message service (SMS) in a GSM network, outgoing SMS in a GSM network, and SM transmission via a GPRS network.

The process unit 42 receives a SM transmission request with a source telephone number, a destination telephone number and an SM from the GSM network, and acquires both first and third parameters corresponding to the destination telephone number from the service configuration records 411. The SM transmission request is issued by a mobile station (MS) with an active phone number. It is determined that both the first and third parameters are negative, and, if so, the process unit 42 transmits an error message to the MS according to the active phone number; otherwise, the process unit 42 transmits the SM to the destination MS corresponding to the destination telephone number by executing a mobile terminated short message service (MT_SMS) procedure.

Figure 5:
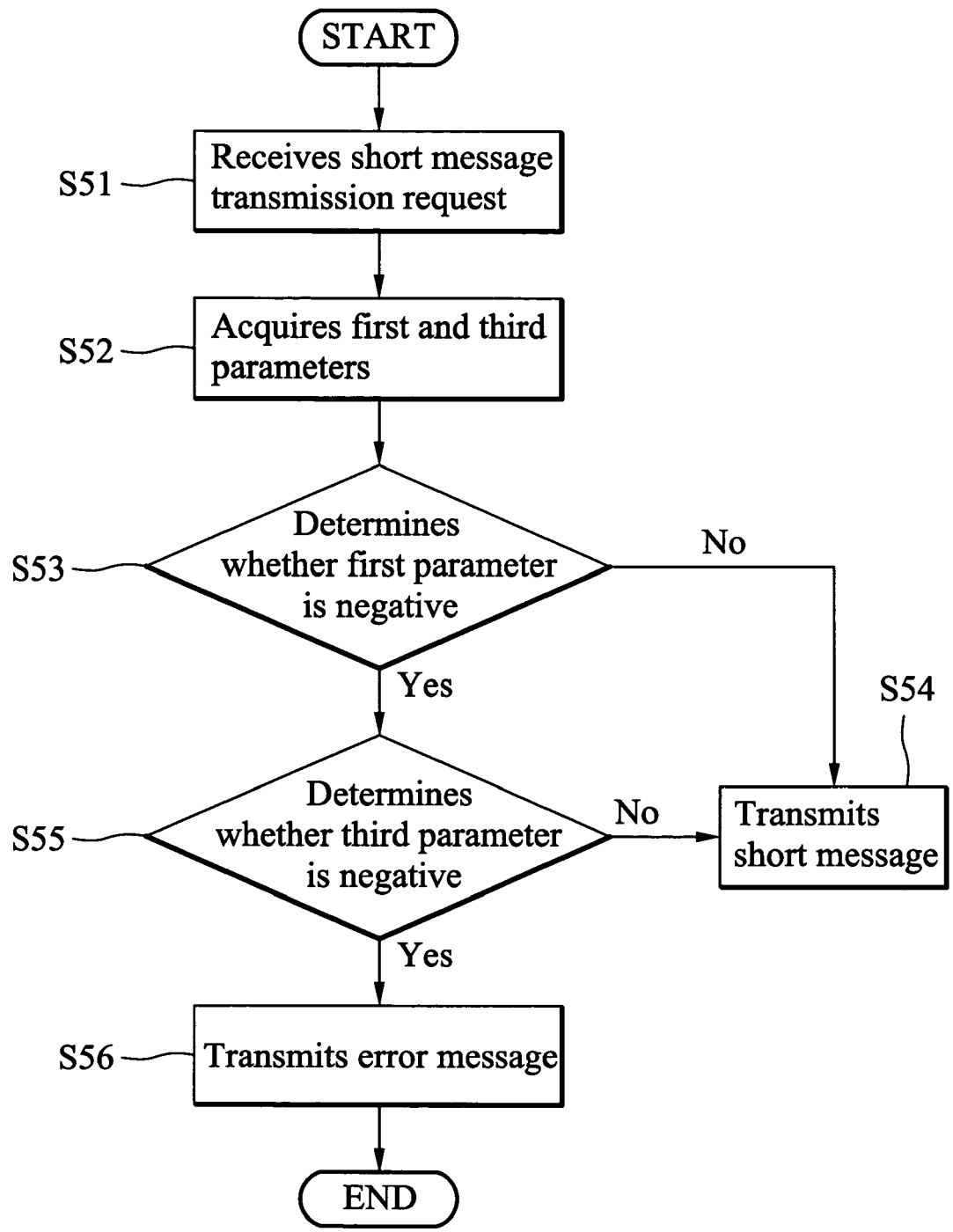
FIG. 5 is a flowchart showing a method of short message barring according to the first embodiment of the invention.

FIG. 5 is a flowchart showing a method of short message barring according to the first embodiment of the invention. The process begins, in step S51, to receive a transmission request with a source telephone number, a destination telephone number and an SM. The SM transmission request is issued by a mobile station (MS) with an active phone number. Step S52 acquires both first and third parameters corresponding to the destination telephone number from the service configuration records 411.

Step S53 determines whether the first parameter is negative, and, if so, the process proceeds to step S55; otherwise, the process proceeds to step S54 to transmit the SM to the destination mobile station (MS) corresponding to the destination telephone number by executing a mobile terminated short message service (MT_SMS) procedure.

Step S55 determines whether the third parameter is negative, and, if so, the process proceeds to step S56 to transmit an error message to the MS according to the active phone number; otherwise, the process proceeds to step S54 to transmit the SM to the destination mobile station (MS).

Figure 6:
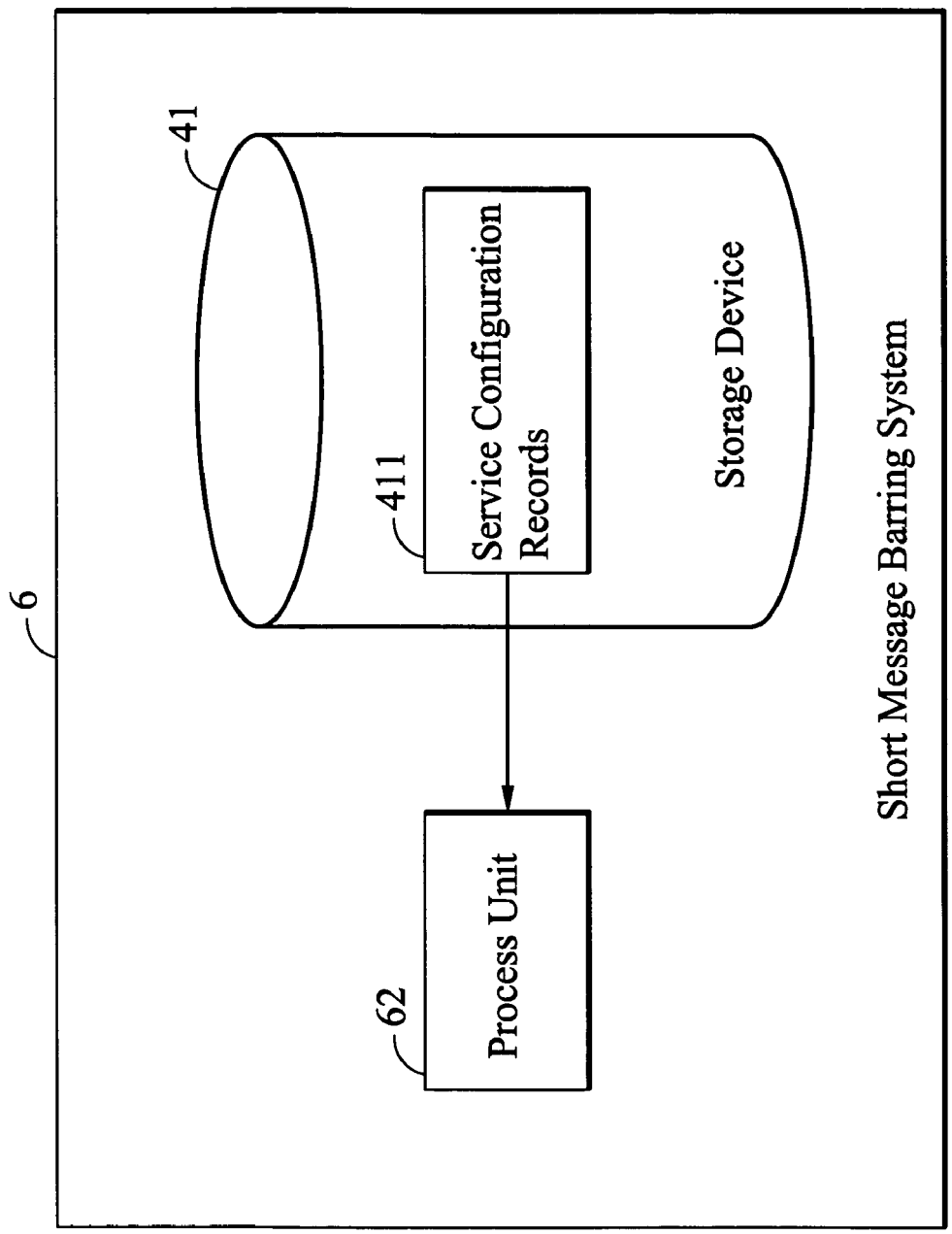
FIG. 6 is a diagram of the system architecture of short message barring according to a second embodiment of the invention.

FIG. 6 is a diagram of the system architecture of short message barring according to a second embodiment of the invention. The system 6 comprises the storage device 41, and a process unit 62. The process unit 62 may be implemented in a serving GPRS support node (SGSN) within a GPRS network.

The process unit 62 receives a SM transmission request with a source telephone number, a destination telephone number and an SM from a source MS corresponding to the source telephone number, and acquires both second and third parameters corresponding to the source telephone number from the service configuration records 411. It is determined that both the second and third parameters are negative, and, if so, the process unit 62 transmits an error message; otherwise, the process unit 62 transmits the SM to the destination mobile station (MS) by executing a mobile originated short message service (MO_SMS) procedure.

Figure 7:
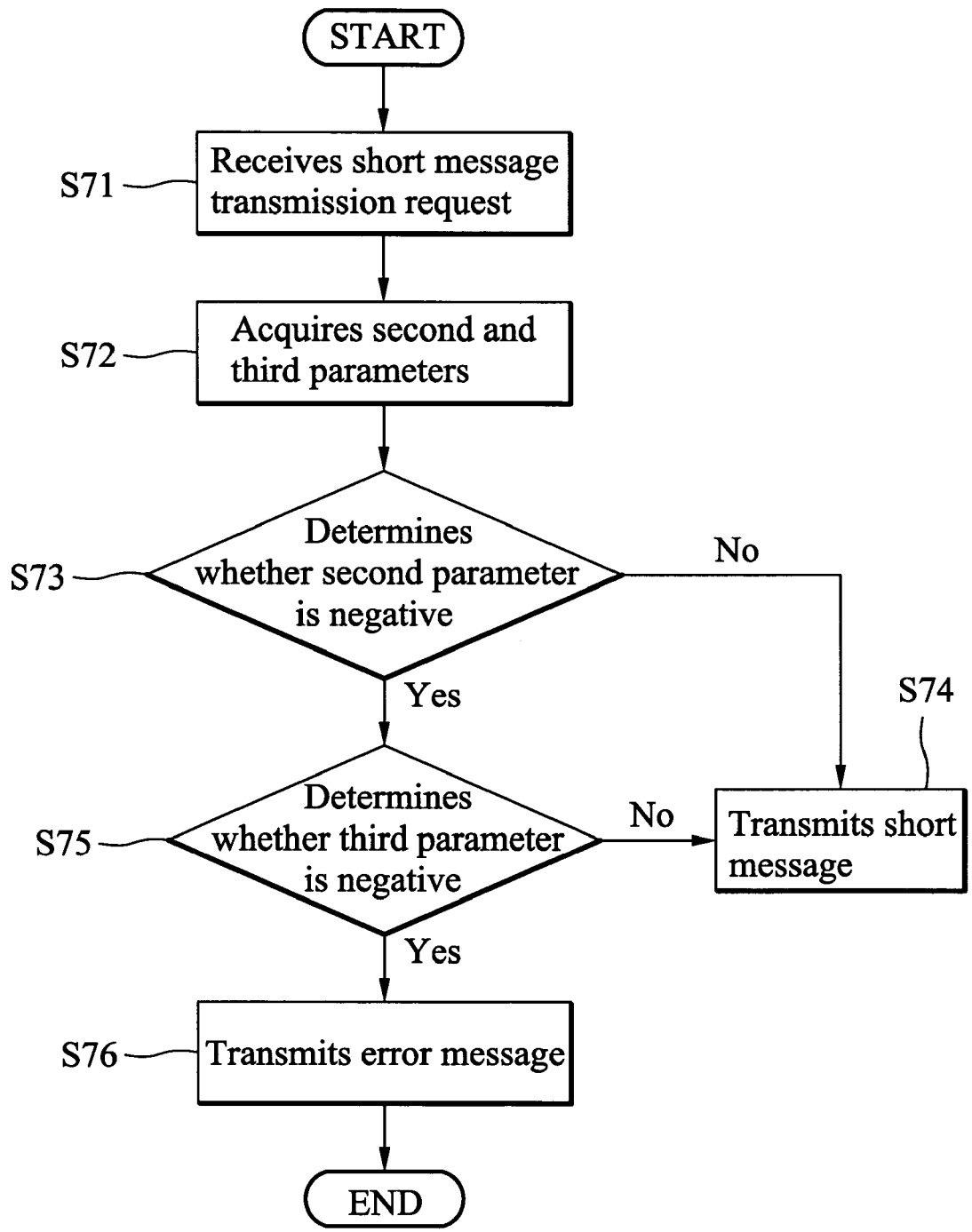
FIG. 7 is a flowchart showing a method of short message barring according to the second embodiment of the invention.

FIG. 7 is a flowchart showing a method of short message barring according to the second embodiment of the invention. The process begins, in step S71, to receive a transmission request with a source telephone number, a destination telephone number and an SM from a source MS corresponding to the source telephone number. Step S72 acquires both second and third parameters corresponding to the source telephone number from the service configuration records 411.

Step S73 determines whether the second parameter is negative, and, if so, the process proceeds to step S75; otherwise, the process proceeds to step S74 to transmit the SM to the destination mobile station (MS) corresponding to the destination telephone number by executing a mobile originated short message service (MO_SMS) procedure.

Step S75 determines whether the third parameter is negative, and, if so, the process proceeds to step S76 to transmit an error message; otherwise, the proceeds to step S74 to transmit the SM to the destination mobile station (MS).

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A system of short message (SM) barring, comprising:
   a storage device for a service configuration record comprising a telephone number, a first parameter and a second parameter, the first parameter indicating whether the telephone number allows incoming short message service (SMS) in a first mobile network, and the second parameter indicating whether the telephone number allows short message transmission via a second mobile network; and
   a process unit, configured to receive a SM transmission request with a destination telephone number and an SM, acquire both the first parameter and the second parameter corresponding to the destination telephone number from the service configuration record, and transmit an error message if both the first parameter and the second parameter are negative.

2. The system as claimed in claim 1 wherein the first mobile network comprises a GSM network.

3. The system as claimed in claim 1 wherein the second mobile network comprises a GPRS network.

4. The system as claimed in claim 1 wherein the SM transmission request is issued by a mobile station with an active phone number, and the error message is transmitted to the mobile station according to the active phone number.

5. The system as claimed in claim 2 wherein the storage device is located in a home location register (HLR).

6. The system as claimed in claim 3 wherein the process unit is located in a serving GPRS support node (SGSN) within the GPRS network, or a home location register (HLR).

7. A system of short message (SM) barring, comprising:
   a storage device for a plurality of service configuration records, each comprising a phone number, a first parameter and a second parameter, the first parameter indicating whether the telephone number allows outgoing short message service (SMS) in a first mobile network, and the second parameter indicating whether the telephone number allows short message transmission via a second mobile network; and
   a process unit, configured to receive a SM transmission request with a source telephone number and an SM, acquire both the first parameter and the second parameter corresponding to the source telephone number from the service configuration records, and transmit an error message if both the first parameter and the second parameter are negative.

8. The system as claimed in claim 7 wherein the first mobile network comprises a GSM network.

9. The system as claimed in claim 7 wherein the second mobile network comprises a GPRS network.

10. The system as claimed in claim 7 wherein the SM transmission request is issued by a mobile station with the source phone number, and the error message is transmitted to the mobile station according to the source phone number.

11. The system as claimed in claim 8 wherein the storage device is located in a home location register (HLR).

12. The system as claimed in claim 9 wherein the process unit is located in a serving GPRS support node (SGSN) within the GPRS network.

13. A method of short message (SM) barring, comprising the steps of:
receiving a SM transmission request with a destination telephone number and an SM;
acquiring both a first parameter and a second parameter corresponding to the destination telephone number from a service configuration record, the service configuration record comprising the destination telephone number, the first parameter and the second parameter, the first parameter indicating whether the destination telephone number allows incoming short message service (SMS) in a first mobile network, and the second parameter indicating whether the destination telephone number allows short message transmission via a second mobile network; and
transmitting an error message if both the first parameter and the second parameter are negative.

14. The method as claimed in claim 13 wherein the first mobile network comprises a GSM network.

15. The method as claimed in claim 13 wherein the second mobile network comprises a GPRS network.

16. The method as claimed in claim 13 further comprising a step of transmitting the SM to a destination mobile station with the destination telephone number if either the first parameter or the second parameter is positive.

17. A method of short message (SM) barring, comprising the steps of:
receiving a SM transmission request with a source telephone number, a destination telephone number and an SM;
acquiring both a first parameter and a second parameter corresponding to the source telephone number from a service configuration record, the service configuration record comprising the source telephone number, the first parameter and the second parameter, the first parameter indicating whether the source telephone number allows outgoing short message service (SMS) in a first mobile network, and the second parameter indicating whether the source telephone number allows short message transmission via a second mobile network; and
transmitting an error message if both the first parameter and the second parameter are negative.

18. The method as claimed in claim 17 wherein the first mobile network comprises a GSM network.

19. The method as claimed in claim 17 wherein the second mobile network comprises a GPRS network.

20. The method as claimed in claim 17 further comprising a step of transmitting the SM to a destination mobile station with the destination telephone number if either the first parameter or the second parameter is positive.

\* \* \* \* \*